United States Patent
Maskiw

(10) Patent No.: US 10,400,977 B2
(45) Date of Patent: Sep. 3, 2019

(54) QUICK ADJUST VEHICLE HEADLIGHT ASSEMBLY

(71) Applicant: Motor Coach Industries Limited, Winnipeg (CA)

(72) Inventor: Rod Maskiw, Winnipeg (CA)

(73) Assignee: Motor Coach Industries Limited, Winnipeg (CA)

( * ) Notice: Subject to any disclaimer, the term of this patent is extended or adjusted under 35 U.S.C. 154(b) by 216 days.

(21) Appl. No.: 15/444,017

(22) Filed: Feb. 27, 2017

(65) Prior Publication Data

US 2018/0245765 A1     Aug. 30, 2018

(51) Int. Cl.
| | |
|---|---|
| *B60Q 1/00* | (2006.01) |
| *F21S 41/50* | (2018.01) |
| *F21S 41/143* | (2018.01) |
| *B60Q 1/04* | (2006.01) |

(52) U.S. Cl.
CPC ............ *F21S 41/50* (2018.01); *B60Q 1/0064* (2013.01); *B60Q 1/0425* (2013.01); *B60Q 1/0483* (2013.01); *F21S 41/143* (2018.01)

(58) Field of Classification Search
CPC ........ F21S 41/50; F21S 41/683; F21S 41/657; B60Q 1/0425; B60Q 1/0064
See application file for complete search history.

(56) References Cited

U.S. PATENT DOCUMENTS

| | | | | |
|---|---|---|---|---|
| 4,722,032 A | * | 1/1988 | Kulka ................... | B60Q 1/0425 362/287 |
| 5,050,049 A | | 9/1991 | Shichijoh et al. | |
| 5,150,939 A | | 9/1992 | Simin | |
| 5,289,358 A | * | 2/1994 | Halemeier ............. | A47B 97/00 362/269 |
| 2002/0131272 A1 | * | 9/2002 | Berne .................. | B60Q 1/0064 362/464 |
| 2003/0142503 A1 | * | 7/2003 | Ericsson .............. | B60Q 1/0064 362/487 |
| 2014/0145837 A1 | * | 5/2014 | Douglas ............... | B60Q 1/0017 340/431 |

(Continued)

FOREIGN PATENT DOCUMENTS

| | | |
|---|---|---|
| CN | 201136458 Y | 10/2008 |
| CN | 101913337 A | 12/2010 |

(Continued)

OTHER PUBLICATIONS

Jul. 3, 2018—(WO) ISR and WO—App. No. PCT/US2018/019715.

(Continued)

*Primary Examiner* — Jong-Suk (James) Lee
*Assistant Examiner* — Christopher E Dunay
(74) *Attorney, Agent, or Firm* — Banner & Witcoff, Ltd.

(57) ABSTRACT

A headlight assembly with a headlight cover having at least one opening to allow a beam of light from a headlight to pass through the opening. The headlight cover may be secured using a snap-fit to allow a user to release and rotate the headlight cover about the hinge without the use of a tool. Once the headlight cover is rotated open, an operator may then adjust a plurality of fasteners located on a headlight sub-assembly to adjust the direction of the beam from the headlight. The headlight sub-assembly may further be rotated about a second hinge to replace a headlight or more extensive repairs.

20 Claims, 6 Drawing Sheets

(56) References Cited

U.S. PATENT DOCUMENTS

2017/0343178 A1* 11/2017 Asghari .................. F21S 41/19

FOREIGN PATENT DOCUMENTS

| CN | 201792788 U | 4/2011 |
| CN | 102887107 A | 1/2013 |
| DE | 2727517 A1 | 12/1978 |
| DE | 3529912 C1 | 10/1986 |
| DE | 10-2009-020324 A1 | 12/2009 |
| DE | 102010021567 A1 | 12/2011 |
| DE | 102011011701 A1 | 8/2012 |
| EP | 0718150 A2 | 6/1996 |
| EP | 1157887 A2 | 11/2001 |
| EP | 1231107 A1 | 8/2002 |
| EP | 1332915 A2 | 8/2003 |
| EP | 2072331 A2 | 6/2009 |
| FR | 2721564 A1 | 12/1995 |
| JP | 2007-246019 A | 9/2007 |
| WO | 00/07844 A1 | 2/2000 |
| WO | 2013139450 A1 | 9/2013 |

OTHER PUBLICATIONS

"Audi A4 B8 2008-2011 Black Light Bar LED DRL Daylight Running Lights Headlights," Website: <http://www.ebay.co.uk/itm/AUDI-A4-B8-2008-2011-BLACK-LIGHT-BAR-LED-DRL-DAYLIGHT-RUNNING-LIGHTS-HEADLIGHTS-/400893525573 Feature 3>, Dec. 7, 2016, six (6) pages, eBay, Inc., UK.

"Daytime Running Light LED Switchback Board 6500K Pure White Kit F-150 2015-2016," Website: http://www.cjponyparts.com/daytime-running-light-led-switchback-board-6500k-pure-white-kit-f-150-2015-2016/p/DRLLED4/Feature 3, Dec. 7, 2016, four (4) pages, CJ Pony Parts, Harrisburg, PA.

* cited by examiner

QUICK ADJUST VEHICLE HEADLIGHT ASSEMBLY

FIELD OF THE INVENTION

This patent relates to a hinged vehicle headlight assembly that may allow an operator access to the headlights to adjust the direction of the headlight beams and also provide a means to replace or repair the headlights.

BACKGROUND

The headlights for any vehicle are an important part of the overall safety features. Whether lighting up the road at night or illuminated as a daytime running light to make the vehicle more noticeable to a bystander, the headlights serve an important safety function. However, sometimes the headlights may not project the beams in the proper direction or may become burned out and need replacement. Providing an operator with a simple means to either adjust the headlight beams or replace the burned out headlights would be beneficial.

BRIEF SUMMARY OF THE INVENTION

This disclosure relates to a vehicle headlight assembly comprising a headlight cover positioned on a front end of a vehicle comprising an exterior surface, an interior surface, a top side, a bottom side, an outboard side, and an inboard side opposite the outboard side. The headlight cover may have a first cover opening and a second cover opening extending through both the exterior surface and the interior surface of the headlight cover to allow a first beam of light from a first headlight to pass through the first cover opening and a second beam of light from a second headlight to pass through the second cover opening. The headlight cover may be rotatably attached to the vehicle with a first hinge attached to the outboard side of the interior surface of the headlight cover. A headlight sub-assembly may be positioned behind the headlight cover and comprise a frame having a first plate, a second plate, and a third plate. The first plate and the second plate may be substantially parallel to each other and the third plate may connect the first plate and the second plate. The first plate may have a first opening, the first headlight extending at least partially through the first opening, and wherein the second plate has a second opening, the second headlight extending at least partially through the second opening. The frame of the headlight sub-assembly may be rotatably connected to the vehicle at an outboard side of the headlight sub-assembly with a second hinge.

This disclosure further relates to a vehicle headlight assembly where the first plate of the frame includes a first set of holes and the second plate includes a second set of holes. The first headlight may be secured to the frame using a first plurality of mechanical fasteners that extend through the first set of holes and the second headlight may be secured to the frame using a second plurality of mechanical fasteners that extend through the second set of holes. The first set of holes may comprise 3 holes that are positioned toward exterior edges of the first plate, where the first set of holes comprises at least two holes that are equidistant to a third hole in the first set of holes. In addition, when each of the first plurality of mechanical fasteners are rotated, the first headlight may be adjusted such that a direction of the first beam of light is changed.

Yet other aspects of this disclosure may relate to a vehicle headlight assembly comprising a headlight cover positioned on a front end of a vehicle comprising an exterior surface, an interior surface, a front side, a rear side, a top side, a bottom side, an outboard side, and an inboard side opposite the outboard side, where a first opening extends through both the exterior surface and the interior surface to allow a beam of light from a headlight to pass through the first opening. A hinge may be attached to the outboard side of the interior surface of the headlight cover and to the vehicle, rotatably attaching the headlight cover to the vehicle, such that the headlight cover is releasably secured at a location inboard of the hinge such that the headlight cover can be rotated about the hinge to access the headlight behind the headlight cover.

The first opening may have a circular shape, where the first opening is tapered such that the first opening in the exterior surface has a larger diameter than the first opening in the interior surface. Also, a portion of the headlight may extend into the first opening and the first opening at the interior surface is larger than an exterior diameter of the headlight. The headlight cover may be releasably secured at a location inboard of the hinge such that the headlight cover can be rotated about the hinge to access the headlight. Additionally, the headlight cover may have a protrusion positioned on the interior surface near the inboard side; and a clip engaged with the vehicle, the clip configured to releasably secure the headlight cover to the vehicle, where the protrusion and the clip form a snap-fit type connection. The headlight cover may have an opaque exterior surface and may also have a second opening extending through the exterior surface, where the second opening is nearer the inboard side of the headlight cover than the first opening.

Still other aspects of this disclosure may relate to a vehicle headlight assembly comprising a headlight cover positioned on a front end of a vehicle, the headlight cover comprising an exterior surface, an interior surface, a front side, a rear side, a top side, a bottom side, an outboard side, and an inboard side opposite the outboard side, where an opening extends through both the exterior surface and the interior surface to allow a beam of light from a headlight to pass through the opening. A first hinge may be attached to the outboard side of the interior surface of the headlight cover and to the vehicle, where the headlight cover is configured to rotate about the first hinge to allow access to a headlight sub-assembly. Also, a plurality of LEDs may be positioned around the top side, inboard side and bottom side of the headlight cover, where the plurality of LEDs may be configured to operate as both daytime running lights and turn signals. The plurality of LEDs may extend within a range of 2 inches and 6 inches along a side of the vehicle. The headlight sub-assembly may further comprise a frame having a first plate, the first plate having a first opening, where the headlight extends at least partially through the first opening and may be secured to the frame. The frame of the headlight sub-assembly may be rotatably connected to the vehicle with a second hinge at an outboard side. The headlight may be secured to the frame with a first set of mechanical fasteners, wherein when each of the first set of mechanical fasteners are rotated, the headlight is adjusted such that a direction of the beam of light is changed. Each of the first set of mechanical fasteners may have an end cap positioned on one end, where each end cap has a diameter within a range of 0.30 inches and 0.50 inches. The headlight cover may be releasably secured at a location inboard of the first hinge such that the headlight cover can be rotated about the first hinge to access the headlight.

BRIEF DESCRIPTION OF THE DRAWINGS

To allow for a full understanding of the present invention, it will now be described by way of example, with reference to the accompanying drawings in which.

DETAILED DESCRIPTION OF THE INVENTION

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Nothing in this specification should be construed as requiring a specific three dimensional orientation of structures in order to fall within the scope of this invention. Also, the reader is advised that the attached drawings are not necessarily drawn to scale.

The following terms are used in this specification, and unless otherwise noted or clear from the context, these terms have the meanings provided below.

"Plurality," as used herein, indicates any number greater than one, either disjunctively or conjunctively, as necessary, up to an infinite number.

"Generally parallel" means that a first line, segment, plane, edge, surface, etc. is approximately (in this instance, within 5%) equidistant from with another line, plane, edge, surface, etc., over at least 50% of the length of the first line, segment, plane, edge, surface, etc.

Figure 1:
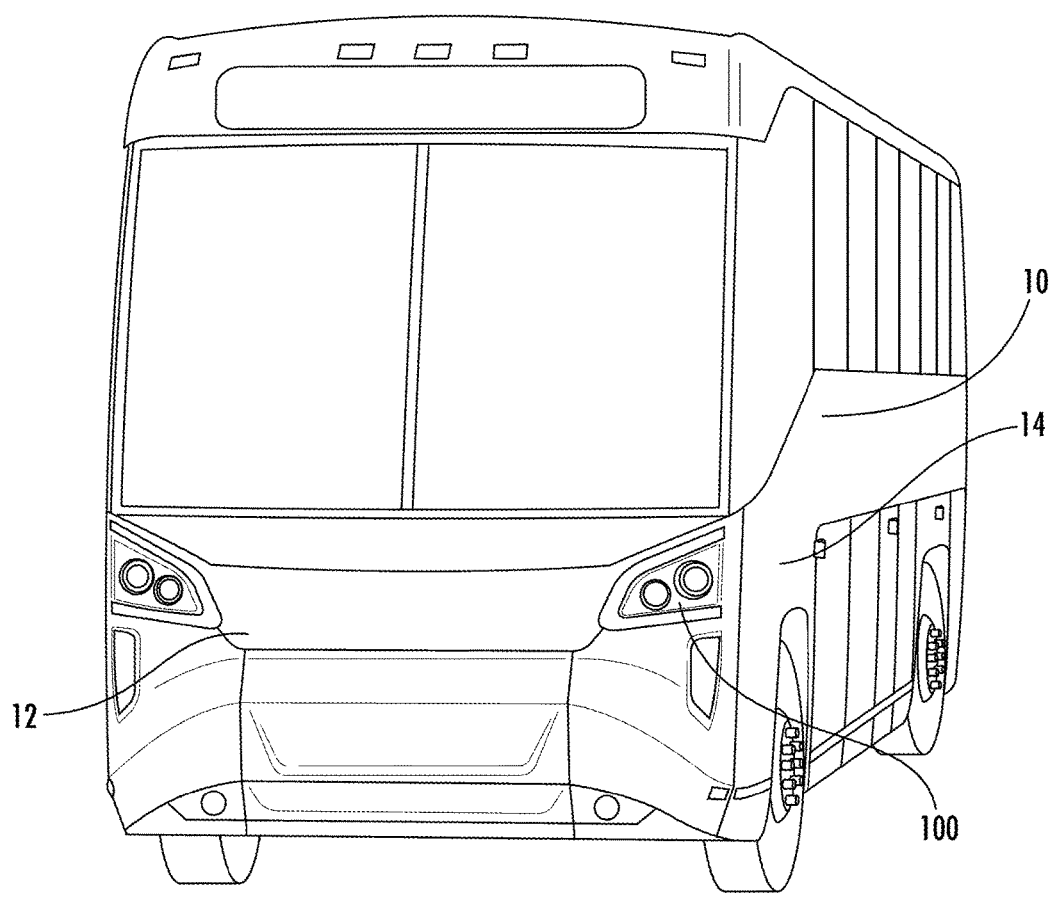
FIG. 1 illustrates a perspective view of an embodiment of the headlight assembly of a vehicle as described herein.

In general, this disclosure relates to a headlight assembly 100 that enables an operator to adjust the direction of the beam of one or more headlights 20, 22 without the use of a tool. Advantageously this may allow the headlight adjustment to be done in a quick and efficient manner. The headlight assembly 100 also has a headlight sub-assembly 150 that may rotate open to allow an operator to change the headlights 20, 22 if they burn out or otherwise need to be replaced. FIG. 1 is as stated briefly above, a perspective view of a vehicle 10 with a headlight assembly 100 as described herein. While the vehicle 10 shown is a motor coach, the headlight assembly 100 as described herein may be used on any vehicle, such as an automobile, bus, tractor, airplane, boat, or other type of vehicle that includes a light to provide illumination to the area in front of a vehicle. In other embodiments headlight assembly 100 may be used in the rear of a vehicle as taillight assembly or may be used on any other portion of a vehicle.

Figure 2:
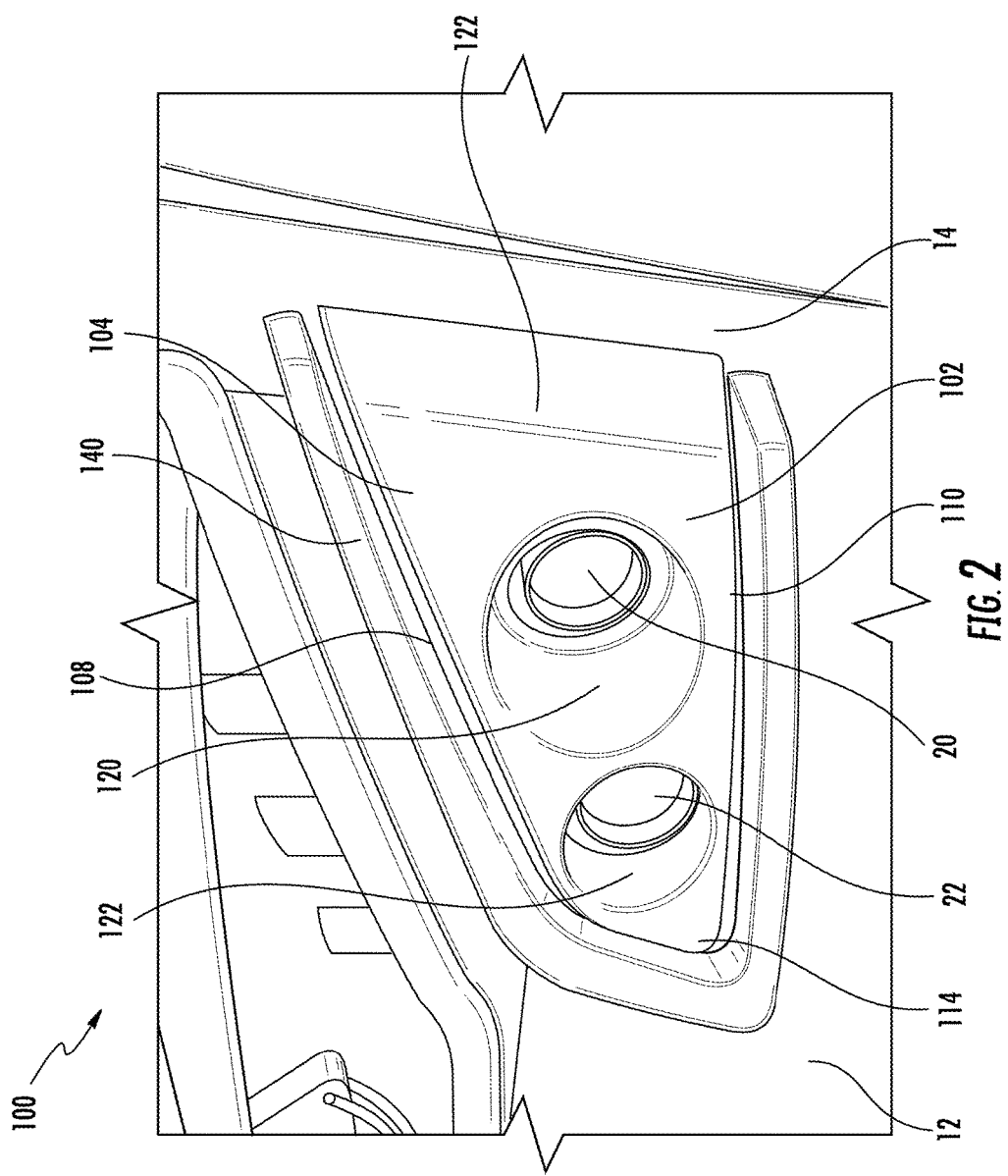
FIG. 2 illustrates a perspective view the embodiment of the headlight assembly of FIG. 1 as described herein.

As shown in FIG. 2, the exterior of the headlight assembly 100 may include a headlight cover 102 positioned on a front end 12 of a vehicle 10. The headlight cover 102 may comprise an exterior surface 104, an interior surface 106, a top side 108, a bottom side 110, an outboard side 112 nearest a side 14 of the vehicle 10, and an inboard side 114 opposite the outboard side 112. The headlight cover 102 may further comprise a plurality of openings 120, 122 that extend through both the exterior surface 104 and interior surface 106. The openings 120, 122 allow for the beams of lights from the headlights 20, 22 to pass through the openings 120, 122 to illuminate the path in front of the vehicle 10. In some embodiments the openings 120,122 may include translucent or transparent covers which may allow light to travel through the openings but restrict particles and/or debris from travelling through the openings 120,122.

In addition, the headlight assembly 100 may include a plurality of LEDs 140 positioned around and adjacent to the top side 108, the inboard side 114, and the bottom side 110 of the headlight cover 102. As shown, for example, in FIG. 1, the plurality of LEDs 140 may generally form a V-shape or U-shape, however in other embodiments, plurality of LEDs 140 may form a circular shape, rectangular shape, triangular shape, or any other suitable shape. The plurality of LEDs 140 may function as daytime running lights that remain on anytime the vehicle 10 is running. The LEDs 140 may also illuminate intermittently to function as a turn signal. The LEDs 140 may illuminate in any color such as illuminate in a yellow or white color when operating as a daytime running light. In addition, when operating as a turn signal, the LEDs 140 may illuminate in the same color as the when illuminated as the daytime running light or alternatively, the LEDs 140 may illuminate in a different color than the color illuminated as the daytime running light. For example, the LEDs 140 may be illuminated in white while operating as a daytime running light and then change color to yellow when illuminated as a turn signal.

The plurality of LEDs 140 may comprise approximately 50 LEDs, or may be within a range of 25 LEDs to 75 LEDs, or may be any suitable number of LEDs. Advantageously the plurality of LEDs 140 may extend along a front 12 of the vehicle and wrap around a side 14 of the vehicle allowing other drivers to see the plurality of LEDs 140 from a wide range of views of the vehicle 10. By wrapping the plurality of LEDs 140 around the side of the vehicle 10, the plurality of LEDs 140 promote visibility to both the side 14 and rear (not shown) of the vehicle 10 to where the LEDs 140 may illuminate an area approximately 15 degrees rearward from a plane perpendicular to the front 12 of the vehicle, or within a range of 10 degrees to 20 degrees rearward from a plane perpendicular to the front 12 of the vehicle. For example, the plurality of LEDs 140 may extend along the side 14 of the vehicle 10 at least 2 inches, or extend along the side of the vehicle 10 within a range of 2 inches to 6 inches where the distance may be measured from where the surface curvature of the front 12 of the vehicle 10 to the side 14 of the vehicle to an edge of the plurality of LEDs 140.

Returning now more specifically to the headlights 20, 22, a portion of one or more of the headlights 20, 22 may extend into at least one of the plurality of openings 120, 122 or a portion of each headlight 20, 22 may extend into each of the plurality of openings 120, 122. The headlights 20, 22 may have one of the headlights designated as a "low beam" headlight, and one of the headlights designated as a "high beam" headlight. Alternatively, the headlight assembly 100 may comprise a single headlight that has both a "low beam" and "high beam" configuration.

The headlight cover 102 may have a tapered shape where the height of the headlight cover 102 at the outboard side 112 is greater than the height of the headlight cover 102 at the inboard side 114. Further, the exterior surface 104 of the headlight cover 102 may be opaque to not allow any light to pass through except for the openings 120, 122. Preferably, the headlight cover 102 may be manufactured from a lightweight, rigid material that may be metallic or non-metallic. For example, the headlight cover 102 may be made from a composite material such as carbon fiber reinforced polymer, glass fiber reinforced polymer; fiberglass, or even an unfilled polymer material. Alternatively, the headlight cover 102 may be an aluminum alloy, a magnesium alloy, or other lightweight, rigid metallic material. The headlight cover 102 may be formed using conventional molding, casting, or forming techniques.

The plurality of openings 120, 122 may have any shape such as a circular, square, or rectangular shape. The openings 120, 122 may each have a tapered shape where the size of the opening at the exterior surface 104 is greater than the size of the opening at the interior surface 106. For example, in the embodiment shown in FIG. 2, each opening 120, 122 has a circular shape, where each opening 120, 122 is tapered such that the diameter of each opening 120, 122 in the exterior surface 104 is greater than the diameter of each opening 120, 122 in the interior surface 106. Additionally, the plurality of openings 120, 122 may comprise two openings such as in the embodiment shown in FIGS. 1-4, where a first opening 120 is nearer the outboard side 112 and a second opening 122 is nearer the inboard side 114 of the headlight cover 102 than the first opening 120. However, the plurality of openings 120, 122 is not limited to the embodiment shown having two openings as such the headlight cover 102 may only comprise one opening or may comprise three openings, four openings or even more openings. The number of openings 120, 122 may equal the number of headlights 20, 22 on the vehicle 10.

Figure 3:
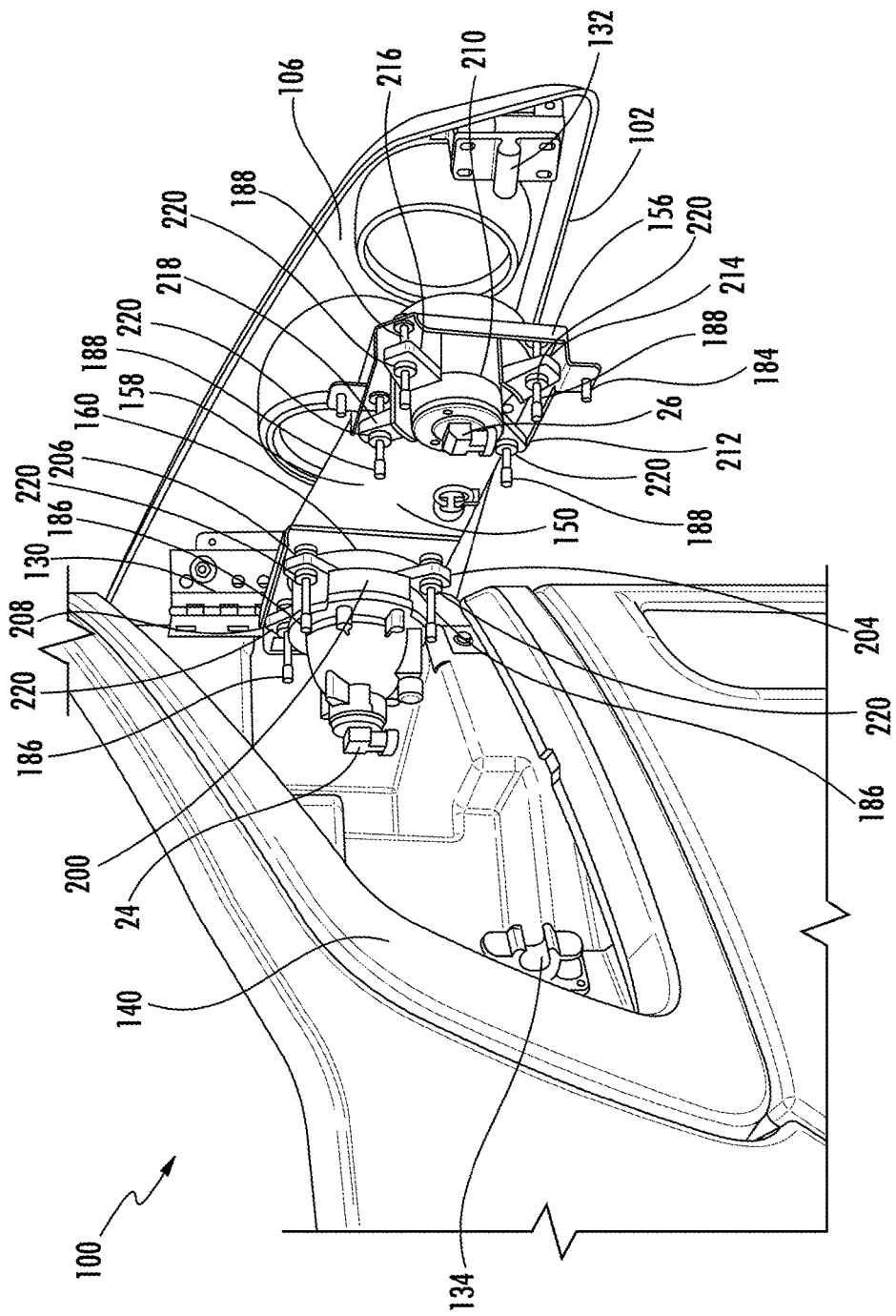
FIG. 3 illustrates a perspective view of the embodiment of the headlight assembly of FIG. 2 with the headlight cover and headlight sub-assembly rotated to show the rear of the headlight sub-assembly.
Figure 4:
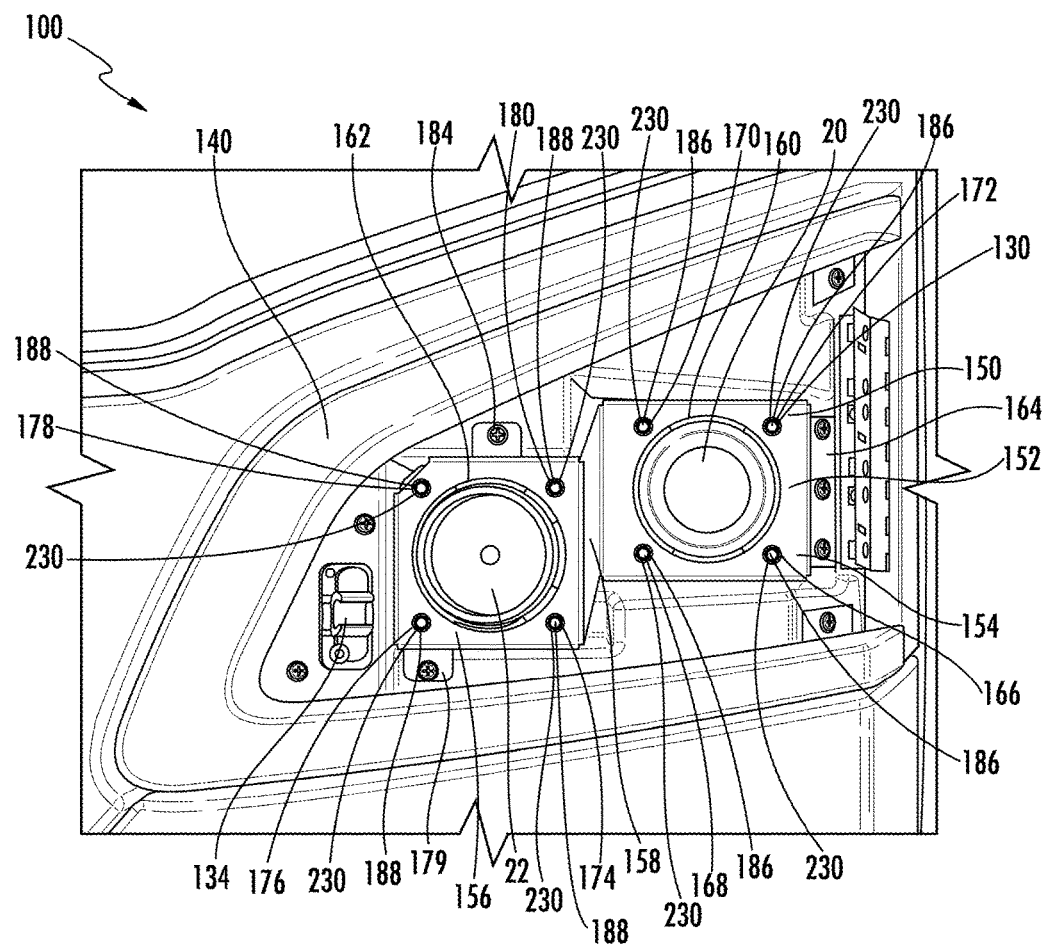
FIG. 4 illustrates a perspective view of embodiment of the headlight assembly of FIG. 2 with the headlight cover removed to show the headlight sub-assembly.
Figure 5:
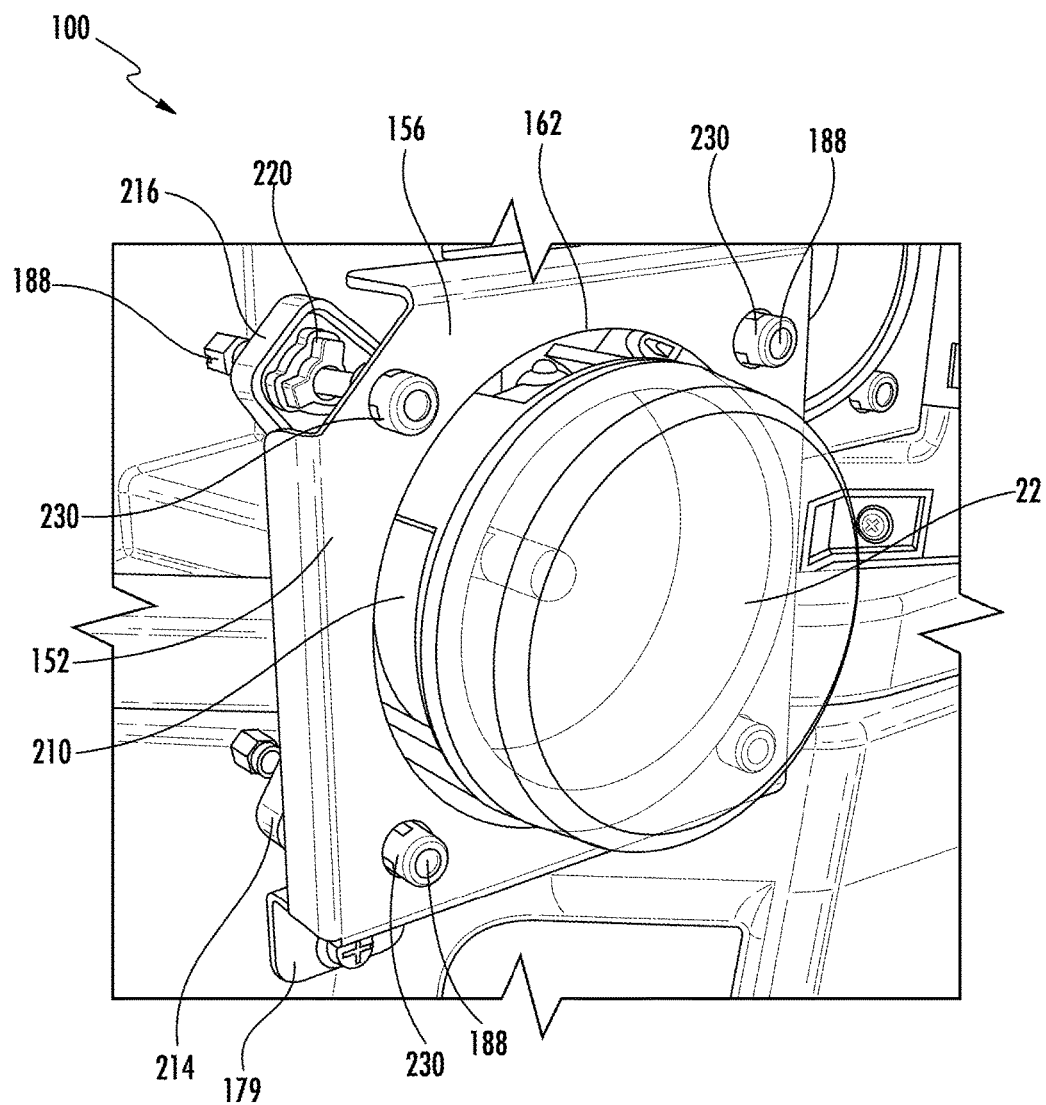
FIG. 5 illustrates a magnified view of headlight sub-assembly of the embodiment of the headlight assembly of FIG. 2.

As shown in FIG. 4, the headlight cover 102 may be pivotally secured to the vehicle at one end with a hinge 130 that allows the headlight cover 102 to rotate about the hinge 130 and to provide an operator access to the headlight sub-assembly 150. FIG. 3 illustrates both the headlight cover 102 rotated about the hinge 130 and the headlight sub-assembly 150 rotated about the second hinge 164 shown in FIG. 4. The headlight cover 102 may be releasably secured at a location opposite the hinge 130 using a snap-fit type connection to allow an operator to rotate the headlight cover 102 open without using a tool. This simplicity saves the operator time when needing to adjust the direction of the headlight beams or to further access the headlights for more extensive repairs or replacement. The snap-fit type connection may comprise a protrusion 132 positioned on the interior surface 106 of the headlight cover 102 near the inboard side 114. This protrusion 132 may have a profile that engages with a clip 134 with a corresponding profile connected to the vehicle 10 to secure the headlight cover 102 with the vehicle 10. The clip 134 may connect to one or more springs to engage and release the snap-fit type connection.

The headlight sub-assembly 150 may be positioned under the headlight cover 102 such that as the headlight cover 102 is rotated about the hinge 130, the headlight sub-assembly 150 may be exposed to allow the operator access. FIG. 4 illustrates a front view of the headlight sub-assembly 150 with the headlight cover 102 removed for clarity. The headlight sub-assembly 150 may comprise a frame 152, a plurality of headlights 20, 22, and a hinge 164. The frame 152 may have a first plate 154, a second plate 156 substantially parallel to the first plate 154, and a third plate 158 connecting the first plate 154 to the second plate 156. The first plate 154 may be positioned forward of the second plate 156. In other embodiments, the frame 152 may include more or less plates 154, 156, 158. For example, in one embodiment, the three plates 154, 156, 158 may be combined into a single contiguous plate. Returning now to FIG. 4, the first plate 154 may have a first opening 160 wherein the first headlight 20 has a portion that extends through the first opening 160, and wherein the second plate 156 has a second opening 162 wherein the second headlight 22 has a portion that extends through the second opening 162.

Opening 160 may be centrally located in the first plate 154. Similarly, opening 162 may be centrally located in the second surface 156. Openings 160, 162 may have any shape such as a circular, square, or rectangular shape. The openings 160, 162 in the frame 152 may be the same shape as the openings 120, 122 in the headlight cover 102.

The frame 152 may be connected to the vehicle 10 with a hinge 164 wherein the hinge 164 is positioned on the outboard side 112 of the frame 152. The headlight sub-assembly 150 may be secured to the vehicle 10 using a mechanical fastener 184 near the inboard side 114 of the frame 152. For example, as shown in FIG. 3, mechanical fastener 184 extends through a mounting hole 178 positioned on a flange 179 connected to the second surface 156. The frame 152 may be secured to the vehicle 10 using a plurality of fasteners 184 as in the embodiment shown in FIG. 3, or alternatively the frame 152 may be secured using a single fastener 184. The fastener 184 may further be constrained to the frame 152 such that the fastener 184 remains with the frame 152 when the headlight sub-assembly 150 is rotated about the hinge 164. In other embodiments, the fastener 184 may be replaced with other types of mechanical fasteners including for example, snap-fit or press-fit connections.

The first plate 154 and the second plate 156 may be substantially rectangular or square in shape, but alternatively may be any suitable shape. The first plate 154 may have a first set of mounting holes 166, 168, 170, 172 positioned near the exterior edges of the first plate 154. Similarly, the second plate 156 may have a second set of mounting holes 174, 176, 178, 180 positioned toward exterior edges of the second plate 156. Each of the first set of mounting holes 166, 168, 170, 172 and the second set of mounting holes 174, 176, 178, 180 may comprise 4 mounting holes.

Both the first set and the second set of mounting holes 166, 168, 170, 172, 174, 176, 178, 180 may be the same size to each receive the same size plurality of mechanical fasteners 186, 188. Additionally, the first set of mounting holes 166, 168, 170, 172 may connect to form a generally square-shaped pattern, such that each of the mounting holes 166, 168, 170, 172 are positioned near the corners of the first plate 154. Similarly, the second set of mounting holes 174, 176, 178, 180 may connect to form a generally square-shaped pattern, such that each of the mounting holes 174, 176, 178, 180 are positioned near the corners of the second plate 156. In other embodiments, there may be more or fewer mounting holes. For example, the mounting holes 166, 168, 170, 172 may have at least two holes 166, 170 that are equidistant to a third hole 168 of the set. Similarly, the mounting holes 174, 176, 178, 180 may have at least two holes 174, 178 that are equidistant to a third hole 176 of the set.

The first and second headlights 120, 122 may be adjustably secured to the frame 152. In embodiments, the first headlight 20 may be adjustably secured to the first plate 154 of the frame 152. The headlight 20 may be secured to the first plate using a first set of mechanical fasteners 186 that extend through the first set of mounting holes 166, 168, 170, 172. Similarly, the second headlight 22 may be adjustably secured to the second plate 156 of the frame 152. The second headlight 22 may be secured to the second plate 156 using a second plurality of mechanical fasteners 188 that extend through the second set of mounting holes 174, 176 178, 180.

In one embodiment, each headlight 20, 22 may be initially secured to a respective mounting ring 200, 210 prior to being secured to the frame 152. Thus, headlight 20 may be secured to the mounting ring 200 and then the mounting ring 200 may be secured to the frame 152. Similarly, headlight 22 may be secured to the mounting ring 210 and then the mounting ring 210 may be secured to the frame 152. The mounting ring 200 may have a plurality of flanges 202, 204, 206, 208 positioned around the mounting ring 200. Each flange 202, 204, 206, 208 may comprise an engaging member 220 secured to each flange 202, 204, 206, 208. Each engaging member 220 may extend through and be secured to each flange 202, 204, 206, 208. Additionally, each engaging member 220 connected to mounting ring 200 may be configured to receive a mechanical fastener 186, such that the mechanical fastener 186 may extend through the engaging member 220. Similarly, each engaging member 220 connected to the mounting ring 210 may receive a mechanical fastener 188, such that the mechanical fastener 188 may extend through the engaging member 220. The engaging members 220 may have a threaded portion that engages the mechanical fasteners 186, 188 such that each flange 202, 204, 206, 208 of the mounting ring 200 and each flange 212, 214, 216, 218 of mounting ring 210 may travel forward and/or backward along their respective mechanical fastener 186, 188 when the mechanical fastener 186,188 is rotated.

Alternatively, the flanges 200, 210 may be have a threaded portion within each flange 202, 204, 206, 208, 212, 214, 216, 218 to directly engage their respective mechanical fastener 186, 188 without using an engaging member 220.

The flanges 202, 204, 206, 208 may be evenly spaced oriented around the mounting ring 200, such that they are 90 degrees apart from one another.

The mounting ring 200 may be secured to the frame 152 by extending each mechanical fastener 186 through one of the mounting holes 166, 168, 170, 172 on the first plate 154 and also through its respectively oriented flange 202, 204, 206, 208 of the mounting ring 200. Each mechanical fastener 186 may be arranged such that when the fastener 186 is rotated the flange 202, 204, 206, 208 of the mounting ring 200 containing the fastener 186 may move either toward or away from the first plate 154 depending upon the direction the fastener 186 is rotated. In this manner, the mounting ring 200 may tilt either up or down, left or right, or a combination to thereby adjust the direction of the beam of light projecting from the headlight 20.

The configuration for the second headlight 22 is similar or identical to the configuration for the first headlight 20. The mounting ring 210 may be secured to the frame 152 by extending each mechanical fastener 188 through one of the mounting holes 174, 176, 178, 180 on the second plate 156 and also through its respectively oriented flange 212, 214, 216, 218 of the mounting ring 210. Each mechanical fastener 188 may be arranged such that when the fastener 188 is rotated the flange 212, 214, 216, 218 of the mounting ring 210 containing the fastener 188 may move either toward or away from the second plate 156 depending upon the direction the fastener 188 is rotated. In this manner, the mounting ring 210 may tilt either up or down, left or right, or a combination to thereby adjust the direction of the beam of light projecting from the headlight 22.

Each fastener 186, 188 may be configured to be adjustable without use of a tool. In one embodiment, each fastener 186, 188 may have an end cap 230 connected to one end of each fastener 186, 188 that enables the fasteners 186, 188 to be rotated with an operator's hand, thus without the use of a tool. As discussed above, this rotation of the fasteners 186, 188 may adjust the position or tilt of the respective mounting ring 200, 210 to thereby adjust the direction of the beam of light projecting from the respective headlight 20, 22. The end caps 230 may engage one end each of the fasteners 186, 188 and also help to secure each of the fasteners 186, 188 to the frame 152. The end cap 230 may be sized to enable the user to easily grip the end cap 230 and easily rotate each of the plurality of fasteners 186, 188. For example, the end cap 230 may have a diameter of approximately 0.40 inches, or within a range of 0.30 inches and 0.50 inches, or within a range 0.25 inches and 0.60 inches. Additionally, the end cap 230 may extend a distance of approximately 0.30 inches or within a range of 0.25 inches and 0.35 inches, or within a range of 0.20 inches and 0.50 inches from either the first plate 154 or second plate 156 depending upon which plate 154, 156 of the frame it is connected. Further the end caps 230 may have a plurality of grooves that may further allow an operator to grip them. Alternatively, the fasteners 186, 188 may be formed of unitary construction with an appropriate sized end, such as an increased diameter, height, or grooved features on one end to allow an operator to easily grip and rotate the fasteners 186, 188. In other alternate embodiments, the fasteners 186, 188 may have one end that requires a tool, such as a screwdriver, to turn the fastener.

In order to adjust the direction of the beams of light coming from the headlight 20, 22 an operator may release the headlight cover 102 from the snap-fit connection and rotate the headlight cover 102 about the hinge 130 to reveal the headlight sub-assembly 150. Since the headlight cover 102 is secured using a snap-fit type connection, the operator may open and close the headlight cover 102 without using a tool. Once the headlight cover 102 is rotated around the hinge 130, the operator may adjust any of the first set of fasteners 186 to change the direction of the beam of either or both of the headlights 20, 22. For example, since the first set of fasteners 186 are connected to the mounting ring 200 which holds the headlight 20, each fastener 186 may be rotated individually to adjust the vertical and horizontal direction of the beam for the headlight 20. In this manner, the first set of fasteners 186 act much the same as adjusting the length of the legs to level a stool. Similarly, the process would be repeated to adjust the direction of the beam for the headlight 22 using the second set of fasteners 188.

If a headlight 20, 22 or headlight bulb 24, 26 needs to be replaced, an operator would release the headlight cover 102 from the snap-fit connection and rotate the headlight cover 102 around the hinge 130 revealing the headlight sub-assembly 150. Next, the operator would remove the fastener or plurality of fasteners 184 securing the headlight sub-assembly 150 to the vehicle 10. Once the fastener(s) 184 is removed, the operator may rotate the headlight sub-assembly 150 around the hinge 164 to access the rear of the sub-assembly 150. The operator may then remove the any electrical cabling to the headlight bulbs 24, 26 and either replace the bulbs 24, 26 or replace the headlight 20, 22 by removing the fasteners 186, 188 securing the mounting rings 200, 210 to the frame 152.

Figure 6:
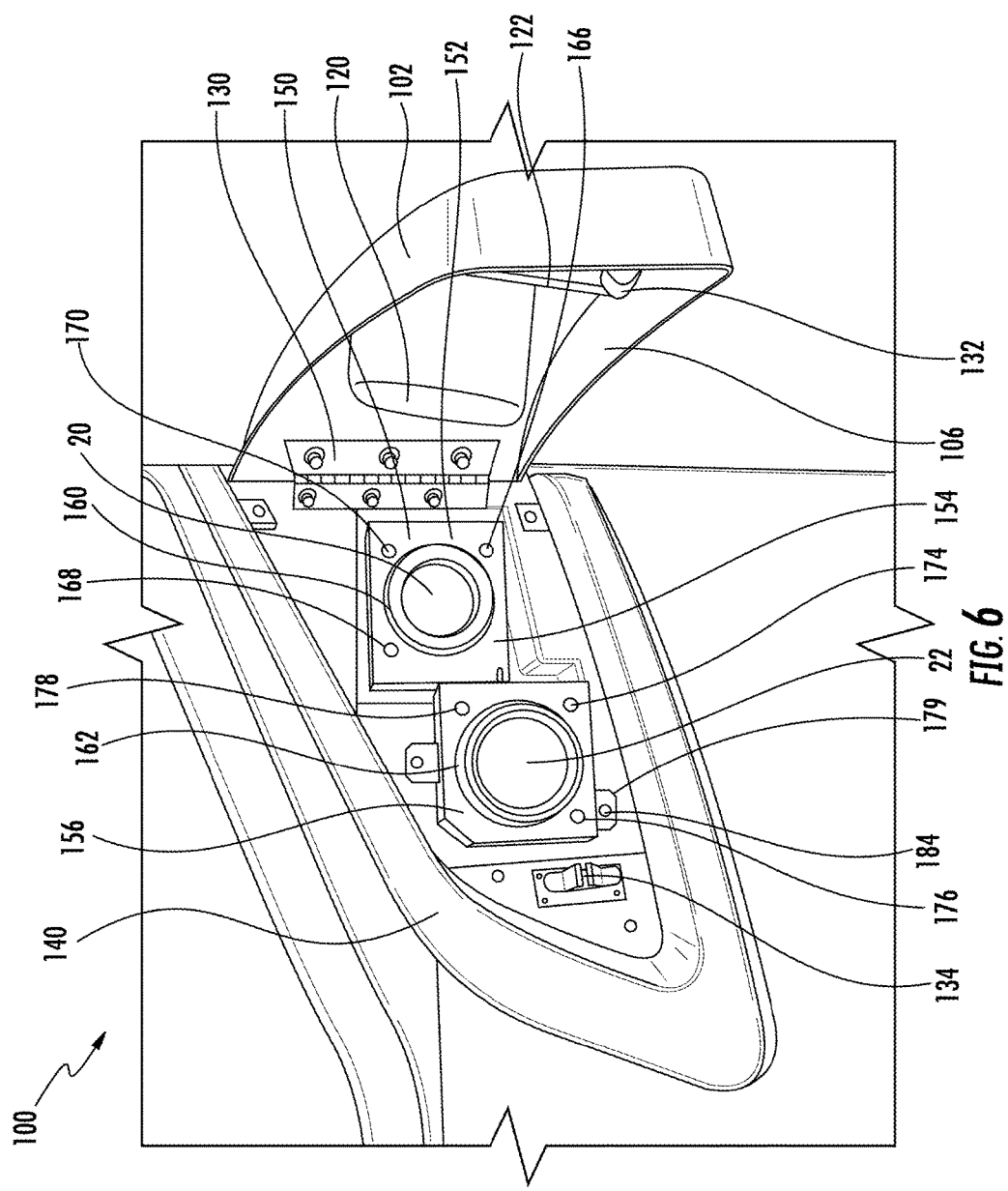
FIG. 6 illustrates an alternate embodiment of the headlight assembly of FIG. 2.

As an alternate embodiment shown in FIG. 6, the headlights may be adjusted using only 3 mechanical fasteners 186, 188. In this embodiment, the first plate 154 and the second plate 156 may be substantially rectangular or square in shape, but alternatively may be any suitable shape. The first plate 154 may have a first set of mounting holes 166, 168, 170 positioned near the exterior edges of the first plate 154. Similarly, the second plate 156 may have a second set of mounting holes 174, 176, 178 positioned toward exterior edges of the second plate 156. Each of the first set of mounting holes 166, 168, 170 and the second set of mounting holes 174, 176, 178 may comprise 3 mounting holes.

Both the first set and the second set of mounting holes 166, 168, 170, 174, 176, 178 may be the same size to each receive the same size a plurality of mechanical fasteners 186, 188. Additionally, the first set of mounting holes 166, 168, 170 may have at least two holes 166, 168 that are equidistant to a third hole 170 of the set. Also, an imaginary line connecting between the center of each of the first set of mounting holes 166, 168, 170 may form a right triangle or alternatively may form an equilateral triangle. Similarly, the second set of mounting holes 174, 176, 178 may have at least two holes 176, 178 that are equidistant to a third hole 176 of the set. Also, an imaginary line connecting between the center of each of the first set of mounting holes 174, 176, 178 may form a right triangle or alternatively may form an equilateral triangle.

Claims conclude this specification. The claims are not to be limited to details of the preferred embodiment except as stated to exist in the claims, and definitions of claim terms are not to be used as a subterfuge to limit the claims to details of the preferred embodiments by defining claim terms narrowly such that they incorporate details of the preferred embodiment.

CONCLUSION

The purpose served by the disclosure is to provide an example of the various features and concepts related to the invention, not to limit the scope of the invention. One skilled in the relevant art will recognize that numerous variations and modifications may be made to the aspects described above without departing from the scope of the present invention, as defined by the appended claims.

I claim:

1. A vehicle headlight assembly comprising:
a headlight cover positioned on a front end of a vehicle comprising an exterior surface, an interior surface, a top side, a bottom side, an outboard side, and an inboard side opposite the outboard side;
wherein a first cover opening and a second cover opening extend through both the exterior surface and the interior surface of the headlight cover to allow a first beam of light from a first headlight to pass through the first cover opening and a second beam of light from a second headlight to pass through the second cover opening;
a first hinge attached to the outboard side of the interior surface of the headlight cover and to the vehicle, rotatably attaching the headlight cover to the vehicle;
a headlight sub-assembly positioned behind the headlight cover comprising:
a frame comprising a first plate, a second plate, and a third plate, wherein the first plate and the second plate are substantially parallel to each other and the third plate connects the first plate and the second plate;
wherein the first plate has a first opening, the first headlight extending at least partially through the first opening, and wherein the second plate has a second opening, the second headlight extending at least partially through the second opening, and
wherein the frame of the headlight sub-assembly is pivotally connected to the vehicle at an outboard side of the headlight sub-assembly with a second hinge.

2. The vehicle headlight assembly of claim 1, wherein the first plate includes a first set of holes and the second plate includes a second set of holes, and wherein the first headlight is secured to the frame using a first plurality of mechanical fasteners that extend through the first set of holes and the second headlight is secured to the frame using a second plurality of mechanical fasteners that extend through the second set of holes.

3. The vehicle headlight assembly of claim 2, wherein the first set of holes comprises 3 holes that are positioned toward exterior edges of the first plate.

4. The vehicle headlight assembly of claim 2, wherein the first set of holes comprises at least two holes that are equidistant to a third hole in the first set of holes.

5. The vehicle headlight assembly of claim 2, wherein the first headlight is adjustably mounted to the frame such that when the first plurality of mechanical fasteners are rotated, a direction of the first beam of light from the first headlight is adjusted.

6. A vehicle headlight assembly comprising:
a headlight cover positioned on a front end of a vehicle comprising an exterior surface, an interior surface, a front side, a rear side, a top side, a bottom side, an outboard side, and an inboard side opposite the outboard side;
wherein a first opening extends through both the exterior surface and the interior surface to allow a beam of light from a headlight to pass through the first opening;
a first hinge attached to the outboard side of the interior surface of the headlight cover and to the vehicle, rotatably attaching the headlight cover to the vehicle, wherein the headlight cover is releasably secured at a location inboard of the first hinge such that the headlight cover can be rotated about the first hinge to access a headlight sub-assembly behind the headlight cover; and
wherein the headlight sub-assembly comprises:
a frame pivotally connected with a second hinge to the vehicle at an outboard side of the frame, the frame comprising a first plate, the first plate having a first opening; wherein the headlight extends at least partially through the first opening and is adjustably secured to the frame.

7. The vehicle headlight assembly of claim 6, wherein the first opening has a circular shape, wherein the first opening is tapered such that the first opening in the exterior surface has a larger diameter than the first opening in the interior surface.

8. The vehicle headlight assembly of claim 6, wherein a portion of the headlight extends into the first opening.

9. The vehicle headlight assembly of claim 6, wherein the exterior surface of the headlight cover is opaque.

10. The vehicle headlight assembly of claim 6, further comprising:
a protrusion positioned on the interior surface near the inboard side; and
a clip engaged with the vehicle, the clip configured to releasably secure the headlight cover to the vehicle.

11. The vehicle headlight assembly of claim 10, wherein the protrusion and the clip form a snap-fit type connection.

12. The vehicle headlight assembly of claim 6, further comprising a second opening extending through the exterior surface; wherein the second opening is nearer the inboard side of the headlight cover than the first opening.

13. A vehicle headlight assembly comprising:
a headlight cover positioned on a front end of a vehicle, the headlight cover comprising an exterior surface, an interior surface, a front side, a rear side, a top side, a bottom side, an outboard side, and an inboard side opposite the outboard side;
wherein an opening extends through both the exterior surface and the interior surface to allow a beam of light from a headlight to pass through the opening;
a first hinge attached to the outboard side of the interior surface of the headlight cover and to the vehicle, wherein the headlight cover is configured to rotate about the first hinge to allow access to a headlight sub-assembly,
wherein the headlight sub-assembly comprises:
a frame pivotally connected with a second hinge to the vehicle at an outboard side of the frame, the frame comprising a first plate, the first plate having a first opening; wherein the headlight extends at least partially through the first opening and is adjustably secured to the frame; and
wherein the exterior surface of the headlight cover is opaque.

14. The vehicle headlight assembly of claim 13, further comprising a plurality of LEDs positioned around the top side, the inboard side and the bottom side of the headlight cover.

15. The vehicle headlight assembly of claim 14, wherein the plurality of LEDs are configured to operate as both daytime running lights and turn signals.

16. The vehicle headlight assembly of claim 14 wherein the plurality of LEDs extend within a range of 2 inches and 6 inches along a side of the vehicle.

17. The vehicle headlight assembly of claim 13, wherein the headlight is adjustably secured to the frame with a first set of mechanical fasteners, wherein when each of the first set of mechanical fasteners are rotated, the headlight is adjusted such that a direction of the beam of light is changed.

18. The vehicle headlight assembly of claim 17, wherein each of the first set of mechanical fasteners has an end cap positioned on one end and wherein each end cap has a diameter within a range of 0.30 inches and 0.50 inches.

19. The vehicle headlight assembly of claim 13, wherein the headlight cover is releasably secured at a location inboard of the first hinge such that the headlight cover can be rotated about the first hinge to access the headlight.

20. The vehicle headlight assembly of claim 13, further comprising a protrusion positioned on the interior surface near the inboard side; and a clip engaged with the vehicle, the clip configured to releasably secure the headlight cover to the vehicle using a snap-fit type connection.

* * * * *